United States Patent [19]

Bragin et al.

[11] Patent Number: 4,534,540

[45] Date of Patent: Aug. 13, 1985

[54] GATE VALVE

[75] Inventors: Boris F. Bragin; Alexandr S. Kolomiets; Jury B. Korotkikh; Felix D. Markuntovich, all of Voroshilovgrad; Evgeny P. Olofinsky, Moscow; Petr V. Gladky, Kiev; Evgeny F. Perepletchikov, Kievskaya oblast; Boris Y. Ekber, Moscow, all of U.S.S.R.

[73] Assignee: Voroshilovgradsky Mashinostroitelny Institut, Voroshilovgrad, U.S.S.R.

[21] Appl. No.: 570,449

[22] Filed: Jan. 13, 1984

[51] Int. Cl.³ .............................................. F16K 25/00
[52] U.S. Cl. .................................. 251/203; 251/328; 251/187
[58] Field of Search ............... 251/187, 203, 204, 161, 251/163, 210, 328

[56] References Cited

U.S. PATENT DOCUMENTS

| | | | |
|---|---|---|---|
| 2,834,571 | 5/1958 | Hollander | 251/203 X |
| 3,164,363 | 1/1965 | Williams | 251/328 |
| 3,272,223 | 9/1966 | Sagg | 251/161 X |
| 3,495,805 | 2/1970 | Steckle | 251/187 |
| 3,547,140 | 12/1970 | Hastings | 251/187 X |
| 3,993,285 | 11/1976 | Conley | 251/328 X |

FOREIGN PATENT DOCUMENTS 2413400 9/1974 Fed. Rep. of Germany ...... 251/203

Primary Examiner—Harold W. Weakley
Attorney, Agent, or Firm—Holman & Stern

[57] ABSTRACT

A gate valve having a casing, a seat, a gate having a tapered face made in the gate surface in the direction of its movement in the shut-off direction on the side opposite to the side facing toward the seat, a stop provided for engaging the tapered face of the gate, the stop being secured to a rod which is installed transversely of the centerline of a passage of the casing, a sleeve installed in the casing wall for rotation relative to the casing, the inner surface of the sleeve being coaxial with, and surrounding the rod, and the longitudinal centerline of the outer surface of the sleeve being eccentric with respect to the longitudinal axis of the rod.

6 Claims, 9 Drawing Figures

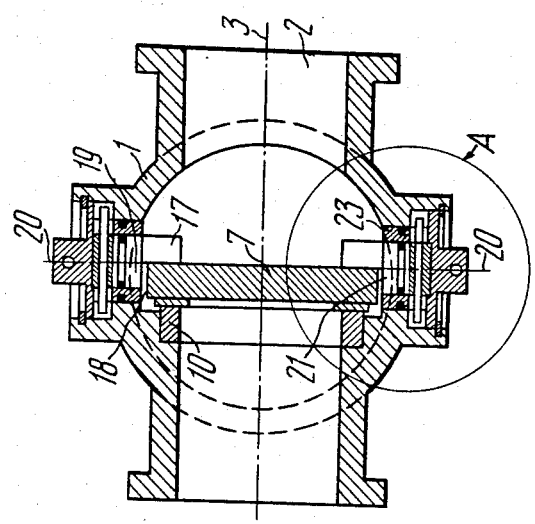
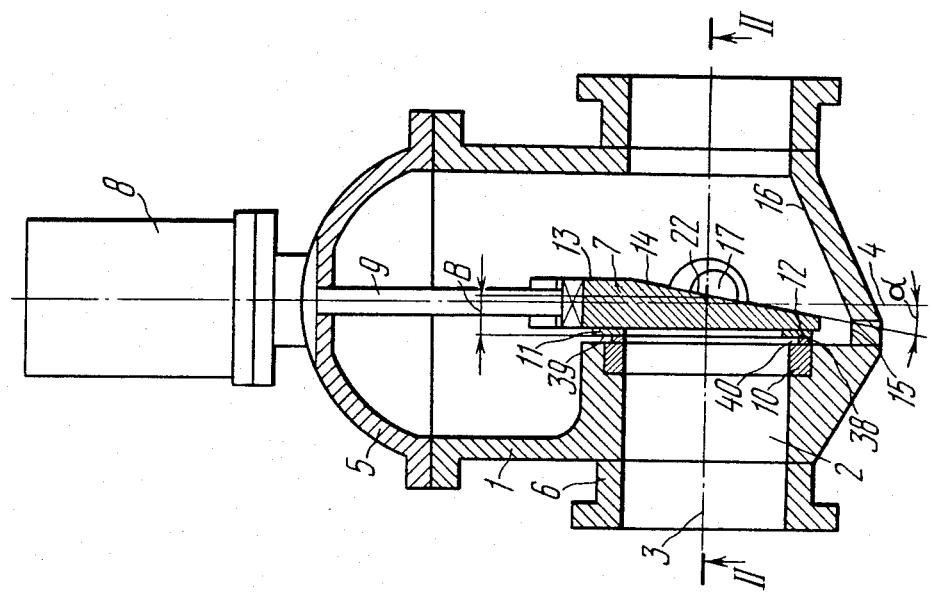

GATE VALVE

BACKGROUND OF THE INVENTION

1. Field of the Invention

The invention relates to shut-off pipeline fittings, and more specifically, it deals with a gate valve.

2. Description of the Prior Art

A gate valve according to the invention may be most efficiently used in pipelines intended for conveying suspended abrasive materials, preferably slurries.

The invention may be used in the mining, construction and chemical industries and also in other industries employing hydraulic and pneumatic conveyance of fluids in the form of suspensions and slurries containing solid particles, especially of fluids which cause a highly intensive wear of the seat and gate which should be replaced during operation.

Known in the art is a gate valve, comprising a casing having a passage. A gate is accommodated in the casing and a seat is installed in alighment with the centerline of the passage (cf. USSR Inventor's Certificate No. 450922, Cl. F 16 k 3/14, F 16 k 3/30, Nov. 25, 1974).

Two stops are installed transversely of the centerline of the passage, the stops engaging with their tapered surfaces tapered faces of the gate provided on the gate side opposite to the side thereof facing toward the seat, when the gate is in the closed position.

The stops are disposed so that each stop is located on the side of the gate opposite to the side thereof facing toward the seat, and adjacent to the side surfaces at the level of the passage centerline.

The tapered surfaces are provided on the side of the gate opposite to the side thereof facing toward the seat and make an acute angle with the direction of movement of the gate into its shut-off position.

When the stops engage the tapered surfaces of the gate, they urge the gate against the end face of the seat facing toward the gate thus ensuring the sealing when the passage is shut-off.

For tightly pressing the gate against said end face of the seat and for ensuring the tightly sealed shutting-off of the passage, the stops should accurately mate with said tapered surfaces.

In the prior art gate valve the stops are rigidly secured to the end face of rods accommodated in the casing. Each rod is installed in a hole of a casing wall along an axis extending transversely of the centerline of the passage for a limited rotation about its axis.

As a result of a rather rapid wear of said seat and gate during operation of the gate valve with abrasive slurries, the distance from the end face of the seat facing toward the cooperating surface to the surface of the stops engaging the tapered faces of the gate should be adjusted frequently.

In the prior art gate valve the end face portion of each rod facing toward the passage is made in the form of a step formed by cutting-off the cylindrical part of the rod to one-half of its diameter.

The stop is secured to the flat faces of the step facing toward the seat, and a set of thin spacers are installed between this surface of the step and the surface of the stop facing toward this surface.

By varying the number of the spacers and thickness of said set the distance from the surface of the seat facing toward the gate to the stop surfaces engaging the tapered faces of the gate may be adjusted.

The amount of rotation of each rod is determined by clearances between the end of a rigidly secured pin protruding from the casing and the wall of a groove made in the rod.

Owing to a limited rotation of the rods about their axes, the rods intimately engage said tapered faces of the gate with their surfaces engageable with the tapered faces of the gate thereby compensating for manufacturing tolerances of angles of taper.

When the prior art gate valve is used, the above-described adjustment of the distance from the surface of the seat facing toward the gate to the surfaces of the stops engageable with the tapered faces of the gate by varying the number of spaces and thickness of the set of spacers is difficult because the rods with the stops secured thereto must be withdrawn from the casing which is only possible after the disconnection of the pipeline thus impairing the cost-effectiveness.

In addition, thin spacers which are normally used in the stops have rather short service life because of corrosion, especially when the gate valves work with abrasive and aggressive fluids.

BRIEF SUMMARY OF THE INVENTION

The invention is based on the problem of providing a gate valve, wherein the stop is installed in such a manner as to enable the adjustment of the distance from the surface of the seat facing toward the gate to the surfaces of the stops engageable with the tapered faces of the gate on the operating pipeline, without withdrawing the stops from the valve casing.

This problem is solved by a gate valve of the invention, comprising a casing in which are accommodated a gate, a seat aligned with the centerline of a casing passage, and at least one stop engageable, when the gate is in the shut-off position, with at least one tapered face of the gate provided on the gate side opposite to its side facing toward the seat in the direction of its movement to the shut-off position, the stop being rigidly secured to a rod installed in the casing along an axis extending transversely of the centerline of the passage for rotation about this axis so as to engage at least a part of the end face of the rod facing toward the centerline of the passage. Therefore to the invention, there is provided a sleeve installed in a casing wall for rotation relative thereto, the inner surface of the sleeve being coaxial with, and surrounding the stop rod, and the longitudinal centerline of the outer surface of the sleeve being eccentric with respect to the longitudinal axis of the rod.

The installation of the rod to which is secured the stop in the sleeve installed in the casing wall and having the inner surface coaxial with the stop rod and the longitudinal centerline of the outer surface offset with respect to the longitudinal axis of the rod makes it possible to adjust the distance from the end face of the seat facing toward the gate to the surface of the stop inclined with respect to the gate by rotating the sleeve. Depending on the direction of rotation of the sleeve, the surface of the stop which is inclined with respect to the gate will either move closer to the end face of the seat facing toward the gate or away therefrom thus varying said distance owing to the eccentricity of the outer surface of the sleeve with respect to the longitudinal axis of the rod.

This construction of the gate valve makes it possible to adjust the distance from the end face of the seat to the surfaces of the stops facing toward the seat on the operating pipeline, without withdrawing the stops and rods from the casing thus substantially saving labor effort and time.

The gate valve preferably has a pin rigidly secured to the rod, extending transversely of the longitudinal centerline of the rod and passing freely through the sleeve, the ends of the pin being freely received in the casing having for that purpose grooves open toward the sleeve for receiving each end of the pin, the side walls of the grooves limiting the displacement of the pin ends when the tapered face of the gate engages the stop, and the sleeve has two radially extending through holes having an angular extent equal to a maximum amount of rotation of the sleeve.

The provision of the above described pins limits the angle of rotation of the rods within a predetermined range and eliminates an inadvertent rotation of the stops under the action of the pipeline vibrations or by virtue of other factors toward the seat thereby preventing any cause which might result in a damage to the stops and improving the reliability of the gate valve.

Owing to the provision of the radially extending through holes in the sleeve, the pin, which is rigidly secured to the rod, does not prevent the sleeve from being rotated over an angle required for the adjustment.

The eccentricity is preferably such that its ratio to the outside diameter of the sleeve should not be in excess of one-half of the coefficient of friction between the sleeve and casing.

This facility prevents the sleeve from inadvertently rotating under the action of external factors and eliminates the undesirable change in the distance from the seat surface facing toward the gate to the surface of the stops engageable with the tapered faces of the gate.

The sleeve preferably has on the end face side opposite to the side facing toward the gate a portion protruding outside the casing, said portion being adapted to take-up a force causing rotation of the sleeve.

The provision of the portion protruding outside the casing facilitates the employment of tools (levers, wrenches, and the like) for turning the stops in the desired direction in performing the adjustment operations.

Annular members made of a wear-resistant material are preferably rigidly secured to the surfaces of the seat and gate engageable with each other when the gate is in the shut-off position.

This facility prolongs the service life of the seat and gate which is especially important with the above described construction of the gate valve wherein a tight engagement of the gate and seat is ensured when the gate is in the shut-off position, which in certain applications might otherwise result in rather strong wear of the gate and seat.

The axis of the annular member secured to the seat is preferably offset with respect to the axis of the seat so that the annular member should be offset in the direction of movement of the gate when the gate is moved into its shut-off position.

This facility results in that the working surface of the seat is disposed outside the zone of action of abrasive particles which are present in the flow so as to prolong the service life of the gate valve.

The gate valve according to the invention enables the adjustment of the distance from the surface of the seat facing toward the gate to the surfaces of the stops engageable with the tapered faces of the gate on the operating pipeline, without withdrawing the stops from the valve casing.

In addition, the gate valve according to the invention has comparatively long service life, it is reliable and convenient in operation.

BRIEF DESCRIPTION OF THE DRAWINGS

The invention will now be described in detail with reference to the accompanying drawings illustrating a specific embodiment wherein:

FIG. 1 is a longitudinal cross-sectional view which schematically shows a gate valve according to the invention, in a longitudinal section;

FIG. 2 is a cross-sectional view taken along the line II—II in FIG. 1;

DETAILED DESCRIPTION

Figure 3:
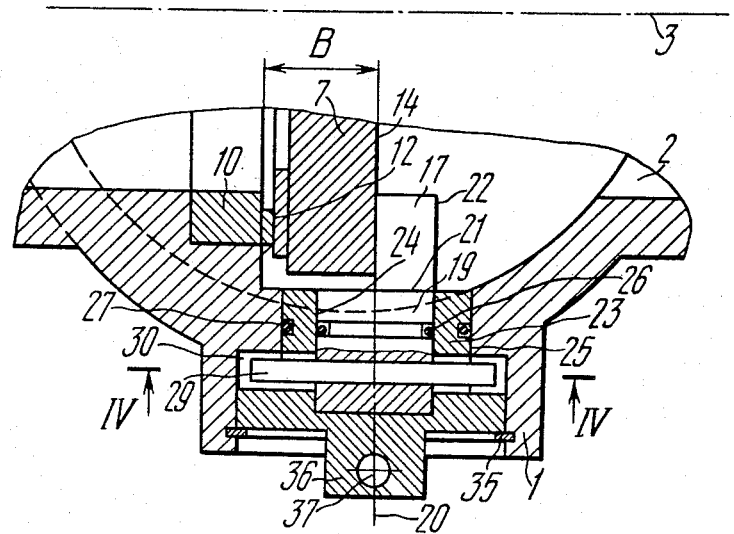
FIG. 3 is an enlarged detail A in FIG. 2.

A gate valve according to the invention comprises a casing 1 (FIG. 1) having a passage 2 for a fluid containing solid abrasive particles, in particular, a slurry.

The passage 2 extends in the casing 1 along its longitudinal centerline 3.

The casing 1 has substantially over its whole height a configuration of a cylinder with a centerline 4 extending at right angles to the centerline 3. An end plate 5 shaped as a part of a sphere is secured at the top to a flange of the casing 1 by means of a flange.

Cylindrical butt pipes 6 integral with the casing 1 are provided in alignment with the centerline 3 of the passage 2 of the casing 1.

The butt pipes 6 are designed for connection to a pipeline (not shown) through which a slurry from a source (not shown) is to be coveyed.

The lower wall of the casing 1 is of a bent configuration at a point adjacent to the centerline 4 as described in detail below.

A gate 7 is installed in the casing 1 along the centerline 4, and the gate is operatively connected to a drive 8 by means of a rod 9 extending through a hole in the end plate 5 along the centerline 4 as shown at the top of FIG. 1.

The drive 8 may be of any appropriate known type, and this drive will not be described in detail herein because it has no bearing on the invention.

A seat 10 is tightly fitted in the casing 1, in a socket made for that purpose in a portion of the casing protruding inwardly, the seat being aligned with the centerline 3. The side of the gate 7 facing toward the seat 10 has an annular projection 11 defining a working surface of the gate 7, also designated at 11, which is designed for an intimate engagement with an end face 12 of the seat 10 facing toward the gate 7, which is hereinafter referred to as the working surface 12.

A surface 13 of the gate 7 which is opposite to its working surface 11 is flat in the top part of the gate 7 as shown in FIG. 1 and extends at right angles to the centerline 3, and the lower part of the surface 13 of the gate 7 has an extension in the form of a tapered face 14 which makes an acute angle $\alpha$ with a vertical plane perpendicular to the centerline 3 in the direction of movement of the gate 7 into its shut-off position.

The cross-sectional area of the upper part of the gate 7 is greater than the cross-sectional area of its lower part.

The inner surface of the lower part of the casing 1 below the gate 7 has a cylindrical portion 15 which is spaced from the free end of the gate 7 when in the shutoff position.

The cylindrical portion 15 is conjugated with a tapering portion 16 which is conjugated with the inner surface of the righthand butt pipe 6 as shown in FIG. 1.

Owing to the provision of the tapering portion 16 of the casing 1, solid particles present in a fluid conveyed through the gate valve and settling below the gate 7 are caused to move by the tapered face of the free end of the gate 7 into the right hand butt pipe 6 as shown in FIG. 1 without hampering the complete shutting-off of the passage 2 of the casing 1.

The casing 1 has two cylindrical stops 17 engageable with the tapered face 14 when the gate 7 is in the shut-off position.

The stops 17 are spaced from each other on the side of the tapered face 14 of the gate 7, adjacent to side faces 18 of the gate (FIG. 2) at the level with the centerline 3 of the passage 2.

Each stop is rigidly secured by any known means to a rod 19 which is installed in the casing 1 transversely of the centerline 3 of the passage 2 for a limited rotation about an axis 20 of the rod 19, together with the rod 19.

Each stop 17 engages a part of an end face 21 of the rod 19 facing toward the centerline 3, of the passage 2.

A periphery 22 (FIG. 3) of the stop 17 is in the form of a half-cylinder, and the outer surface of the stop is an extension of the cylindrical surface of the rod 19.

A part of the surface 22 of the stop 17 facing toward the gate 7 is flat and is inclined also at an acute angle $\alpha$ with respect to a vertical plane perpendicular to the centerline 3 of the passage 2 (FIG. 1).

Sleeves 23 (FIGS. 2 and 3) are provided in the casing 1, each sleeve surrounding a respective rod 19. Each sleeve 23 is installed in a respective through hole of the wall of the casing 1 for rotation relative to the casing 1.

The inner surface 24 (FIGS. 3, 4) of the sleeve 23 is coaxial with, and surrounds the rod 19.

The outer surface 25 of the sleeve 23 mates with the surface of the through hole in the wall of the casing 1.

The mating surfaces 24 and 25 of the sleeve 23 are sealed with respect to corresponding mating surfaces of the rod 19 and casing 1 by means of seals 26 and 27 which may be of any appropriate known type (FIG. 3).

Figure 4:
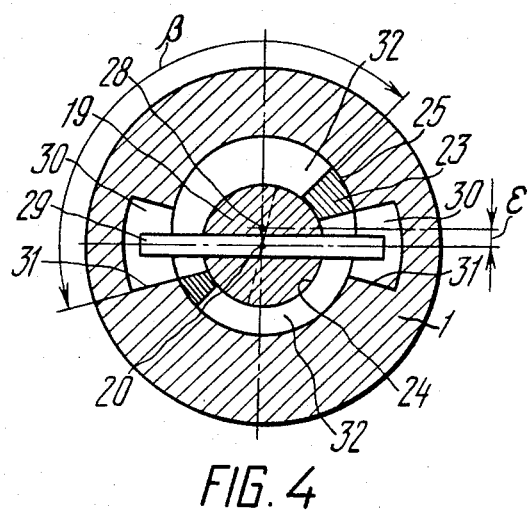
FIG. 4 is an enlarged cross-sectional view taken along the line IV—IV in FIG. 3.

The longitudinal centerline of the outer surface 25 of the sleeve 23, the projection of which on the plane of the drawing in FIG. 4 is designated as a point 28, is offset with an eccentricity "$\epsilon$" with respect to the axis 20 of the rod 19 (FIG. 3) which is shown as the point 20 in FIG. 4.

This construction makes it possible to adjust the distance "B" (FIGS. 1 and 3) from the end face 12 of the seat 10 facing toward the gate 7 to the flat surface of the stop 17 by rotating the sleeve 23 about its longitudinal centerline shown as the point 28 in FIG. 4.

This facility enables the adjustment of the distance "B" upon replacement of the seat 10 and gate 7 without removing the casing 1 from the pipeline, and any fitting operations during installation of a new set of the seat 10 and gate 7 may be dispensed with.

A pin 29 (FIGS. 3 and 4) is provided which is rigidly secured to the rod 19 and extends at right angles to the axis 20 of the rod 19.

The pin 29 passes freely through the sleeve 23 and has its ends freely received in the casing 1. For that purpose grooves 30 open toward the sleeve 23 are made in the casing for each end of the pin 29.

Side walls 31 (FIG. 4) of the groove 30 of the casing 1 are designed for limiting the displacement when the tapered face 14 of the gate 7 engages the stop 17.

The sleeve 23 has two radially extending through holes 32, respectively, for a free passage therethrough of the ends of the pin 29.

The angular extents $\beta$ of the holes 32 are equal to maximum angles of rotation of the sleeve 23.

The pins 29 retain the stops 17 rigidly secured to the rods 19 at an angle which is equal to the angle of taper of the tapered face 14 of the gate 7, and the free arrangement of the ends of the pins 29 in the grooves 30 of the casing 1 allows the surfaces of the stops 17 to align against the tapered face 14 of the gate 7 thus compensating for a manufacturing tolerance of the angle $\alpha$ of taper of the tapered face 14 which is imposed in making the gate 7.

Owing to the provision of the radially extending through holes 32, the pin 29 does not prevent the sleeve 23 from rotating when the adjustment operation is performed.

The eccentricity "$\epsilon$" is such that the ratio of the eccentricity to the outside diameter of the sleeve 23 "D" is not in excess of one-half of the coefficient of friction "$\mu$" between the sleeve 23 and the casing 1.

Figure 5:
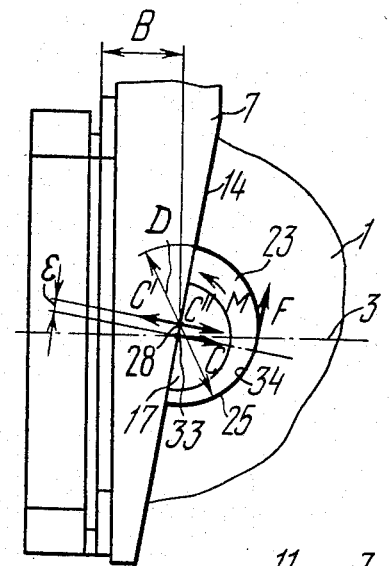
FIG. 5 schematically shows a seat, a part of a gate, and a stop; vectors of forces between the gate and stops are also shown on the enlarged scale.

In this case, as shown in FIG. 5, the force "C" of pressure of the tapered face 14 of the gate 7 applied at a point 33 at which the centerline 3 intersects the tapered face 14, is spaced from the point 28, which is the projection of the longitudinal centerline of the outer surface of the sleeve 23 on the drawing plane, at a distance equal to the eccentricity "$\epsilon$".

A statical equilibrium of forces "C'" and "C''" equal to the forces "C" and directed oppositely to one another occurs at the point 28. The couple of forces "CC'" results in a moment M=C·$\epsilon$ which tends to turn the sleeve 23 counterclockwise so as to increase the distance "B" thus tending to unseal the gate valve.

At the same time, the force "C''", which is equal to the force "C", urges the outer surface 25 of the sleeve 23 against the wall 34 (FIG. 5) of the hole in the casing 1 provided for the sleeve 23 thereby creating a friction force "F" which is equal to a product of the force "C"="C''" by the coefficient of friction "$\mu$" between the sleeve 23 and the wall of the casing 1.

The friction force "F" acts with an arm equal to one-half of the diameter "D" of the outer surface 25 of the sleeve 23. As a result of the action of the force "C" a moment "M'" of friction (not shown) is applied which is equal to a product of the friction force "F" by one-half of the diameter "D". In order to prevent the sleeve from inadvertently rotating about its longitudinal centerline, it is necessary that the inequality $M' \geq M$ be complied with, i.e. $(\epsilon/D) \leq \mu$.

With the ratio of the eccentricity "$\epsilon$" to the diameter "D" of the sleeve 23 smaller than one-half of the coefficient of friction "$\mu$" the sleeve 23 is retained, its inadvertent rotation is prevented, and the conditions for sealing of the gate valve are improved.

On the end face side opposite to the side thereof facing toward the gate 7, the sleeve 23 is held against axial movement by a retaining ring 35 (FIG. 3) which is installed in an annular groove of the casing 1, and the sleeve 23 has a portion 36 protruding outside the casing 1 to provide application of a force for rotation of the sleeve 23.

The protruding portion 36 has a cylindrical periphery. A hole 37 is made in the protruding portion 36 to extend through the longitudinal centerline of the outer surface 25 of the sleeve 23, at right angles thereto.

The hole 37 is designed for receiving a lever (not shown) to which is applied a force for rotating the sleeve. This facilitates rotation of the sleeve 23 in making the adjustment.

To prevent the gate 7 and seat 10 from being worn upon an intimate engagement of their surfaces under the action of the stops 17, annular members 38 and 11 (FIG. 1) are rigidly secured to the surfaces of the seat 10 and gate 7 engaging each other when the gate 7 is in the shut-off position, the annular members being made of a wear-resistant material and defining projections on the seat 10 and gate 7, having working surfaces 12 and 39, respectively.

Owing to the provision of the annular members 38 and 11 made of a wear-resistant material the service life of the gate 7 and seat 10 engaging each other is prolonged.

Figure 9:
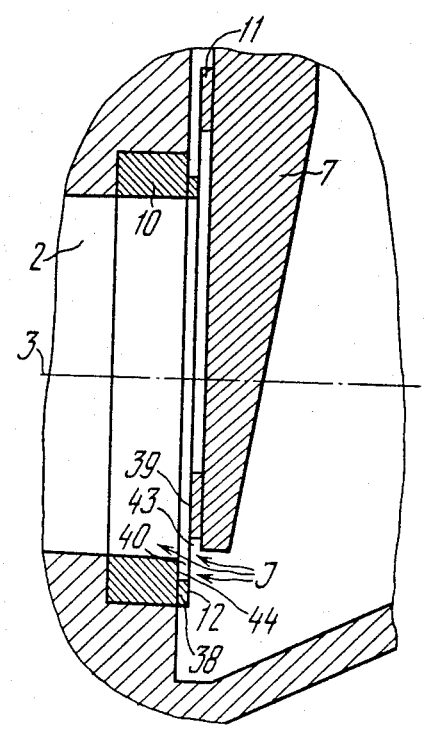
FIG. 9 is a view, similar to FIG. 8 of a seat and a part of a gate at the beginning of the gate movement into its open position.

The annular member 38 is rigidly secured to the surface of the seat 10 in an offset position, with an offset in the direction of movement of the gate 7 when the gate is moved into the shut-off position so that a crescent-shaped recess 40 is defined adjacent to the working surface 12 of the seat 10 (FIG. 9), which is formed by arcs of circles of the cross-section of the passage 2 and the inner surface of the annular member 38. This construction of the seat 10 allows the lower part of the working surface 12 of the seat 10 to be disposed outside the zone of the mainstream of the fluid flow, which might otherwise be subjected to the action of coarsest and most abrasive solid particles present in the flow which are forced under gravity to the lower boundary of the flow. The service life of the working surfaces of the seat 10 and gate 7 is thereby further prolonged.

The gate valve according to the invention functions in the manner which will now be described.

Under the action of the drive 8 the rod 9, connected to the drive, starts reciprocating along the centerline 4 of the casing 1 and causes the movement of the gate 7 connected to the rod 9.

When the gate 7 moves upward in FIG. 1, the working surface 39 of the annular projection 11 of the gate 7 disengages from the working surface 12 of the seat 10 and opens the passage 2 of the casing 1 for the passage therethrough of a fluid being conveyed.

When the gate 7 moves downward in FIG. 1, the working surface 39 of the annular projection 11 of the gate 7 engages the working surface 12 of the seat 10 and shuts-off the passage 2 of the casing 1.

The tapered face 14 of the gate 7 making an acute angle "$\alpha$" with a vertical plane perpendicular to the centerline 3 of the passage 2 engages the flat surfaces 22 of the stops 17 which are also inclined at an acute angle "$\alpha$" to a vertical plane perpendicular to the centerline 3 of the passage 2. When the tapered face 14 engages the flat surfaces 22 of the stops 17, the working surface 39 of the annular projection 11 of the gate 7 is urged against the working surface 12 of the seat 10 thus ensuring the sealed shutting-off of the passage 2.

Solid particles of the fluid being conveyed thus get beneath the free end of the gate 7 and are caused to move under the action of the free end of the tapered face 14 of the gate 7 along the tapering portion 16 of the casing 1 into the righthand butt pipe 6 in FIG. 1, without hampering the movement of the gate 7.

Figure 6:
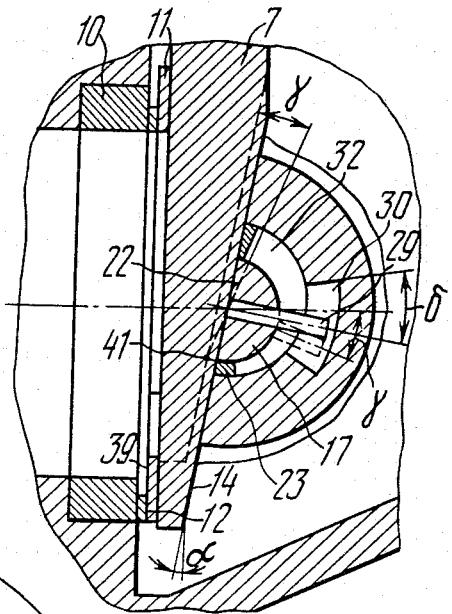
FIG. 6 is an enlarged cross-sectional view which schematically shows an enlarged view of a seat, a part of a gate, and a stop in when tapered faces of the gate are made with a deviation of their angle of taper toward the stops.

In case of deviations of the angles of taper $\alpha$ of the gate 7 and stops 17 as a result of manufacturing tolerances in making the gate valve, e.g. by an angle $\gamma$ (FIG. 6) the gate 7 moving downward, short of its lowermost position, engages with its tapered face 14 with the flat surface 22 of the stop 17 facing toward the gate 7 only along the lower line shown by a point 41 in FIG. 6, rather than over the whole surface. The positions of the lower end of the tapered face 14 of the gate 7 and the surface 22 of the stop 17 at the moment of engagement along the line corresponding to the point 41 are shown with dotted lines in FIG. 6.

During further downward movement of the gate 7 its tapered face 14 urges the end of the flat surface 22 of the stop 17 to the right in FIG. 6 and causes its rotation counterclockwise about the axis 20 of the rod 19 so that when the gate 7 is in the lowermost position the flat surface 22 is in complete engagement with the tapered face 14 of the gate 7 as shown with solid lines in FIG. 6.

The pin 29 also rotates counterclockwise through an angle "$\gamma$" from the position shown in dotted line to a position shown with solid line. As one-half of the angular extent of each groove 30 of the casing 1 is equal to an angle "$\delta$", which is greater than the angle "$\gamma$" equal to one-half of the manufacturing tolerance for the gate 7, the groove 30 hampers rotation of the stop 17 over the angle "$\gamma$".

As the angular extent "$\beta$" of the radially extending through holes 32 of the sleeve 23 is much greater than the angle "$\alpha$", the sleeve 23 also does not hamper rotation of the stop 17 rigidly secured to the rod 19 about the axis 20 of the rod 19.

Therefore, the flat surface 22 of each stop 17 is positioned, and intimately engages the tapered face 14 of the gate 7, so as to tightly urge the working surface 39 of the annular projection 11 of the gate 7 against the working surface 12 of the seat 10.

Figure 7:
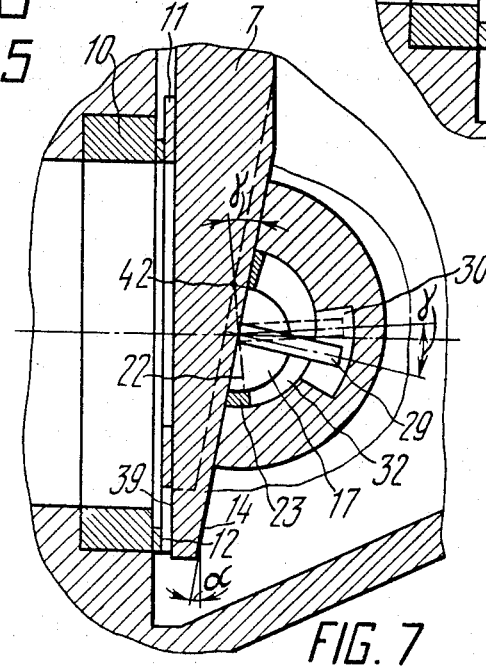
FIG. 7 is is a view similar to FIG. 6 showing the gate tapered faces made with their angle of taper in the direction away from the stops.

If the angle of taper "$\alpha$" of the tapered face 14 of the gate 7 deviates in the direction opposite to that shown in FIG. 6, as shown in dotted line, the tapered face 14 engages the flat surface 22 of each stop 17 along the line shown by a point 42 in FIG. 7 and causes its rotation clockwise with the result that in the lowermost position of the flat surface 22 this surface intimately engages the tapered face 14 of the gate 7 so as to tightly urge the working surface 39 of the annular projection 11 of the gate 7 against the working surface 12 of the seat 10.

Thus a tight sealing in shutting-off the flow of a fluid being conveyed is ensured.

The self-alignment of the flat surface 22 of each stop 17 improves the cost-effectiveness of the gate valve owing to a lower labor effort for the manufacture of the gate 7 since a rather labor-consuming manufacturing process associated with the fitting of the angle of taper "α" of the tapered face 14 of the gate 7 to the angle of inclination of the flat surface 22 of each stop 17 may be dispensed with.

Deviations of the distance "B" from the surface 12 of the seat 10 to the flat surface 22 of the stop 17 may occur during manufacture. The distance "B" is equal to the dimensions of the gate 7, namely to its thickness as shown in FIG. 1 along the centerline 3 when the gate 7 is in the shut-off position.

The dimensions of the gate 7 may be equal to "$B_1$" (FIG. 8) which is greater than the distance "B", or "$B_2$" (not shown) which is smaller than the distance "B". If the dimension "$B_1$" of the gate 7 is greater than the distance "B", the gate 7, will stop short of its lowermost position, and in this case the working surface 39 of the annular projection 11 of the gate 7 will not engage the working surface 12 of the seat 10 so that the flow will not be shut-off with a desired tightness.

This may be remedied by rotating the sleeve 23 in the direction shown by arrow "G". The point 33, which is the center of the cross-section of the stop 17 transversely of the axis 20, rotates counterclockwise about the point 28 along a circle of a radius "R" as shown with a dash-and-dot line in FIG. 8. The stop 17 will thus move along the centerline 3 of the passage 2 as shown by arrow "H" so as to enlarge the distance "B". The sleeve 23 is rotated until the distance "B" becomes equal to "$B_1$" and the stop 17 is in the position shown with dotted line in FIG. 8.

Figure 8:
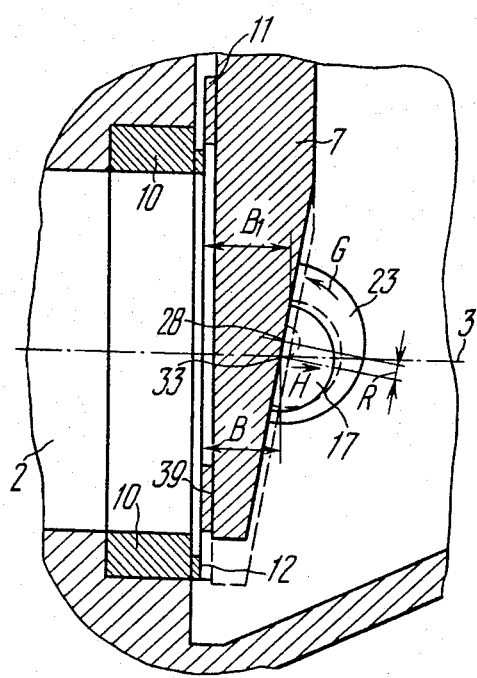
FIG. 8 is an enlarged schematic cross-sectional view of a part of a gate and a stop when the gate thickness deviates from a pre-set thickness; the gate in the shut-off position and the respective position of the stop are shown in dotted lines.

After this adjustment the gate 7 will be in the position shown in dotted lines in FIG. 8 when in the shut-off position thereby providing for a tight shutting-off of the passage 2.

When the dimension "$B_2$" of the thickness of the gate 7 is smaller than the distance "B", the sleeve 23 is rotated clockwise in the direction opposite to that shown by arrow "G". The stop 7 will then move along the centerline 3 of the passage 2 to the left in FIG. 8 so as to reduce the dimensions "B" to the value of "$B_2$". This provides for a tight shutting-off of the passage 2 when the gate 7 is in the shut-off position.

Owing to the adjustment of the distance "B" by means of the rotatable sleeve 23 a rather labor-consuming operation of fitting the thickness of each gate 7 to a distance "B" from each stop 17 to the working surface 12 of the seat 10 may be dispensed with.

With a minor opening of the passage 2 between the seat 10 and gate 7 at the beginning of the opening operation or at the end of the shutting-off the flow of fluid passing through such clearance 43 (FIG. 9) in the passage 2 as shown by arrow "J" has increased velocities owing to the restriction. In view of higher velocities the wear of the working surface 12 of the seat 10 and working surface 39 of the gate 10 may be accelerated. This may cause a premature failure of the abovementioned working surfaces and shorter service life of the valve.

The service life of the working surfaces 12 and 39 in the gate valve according to the invention is prolonged because these surfaces are defined on annular members 11 and 38 made of a wear-resistant material and rigidly secured to the gate 7 and seat 10. The offset position of the annular member 38 of the seat 10 in the direction of movement of the gate 7 when it is moved into the shut-off position also contributes to the prolongation of the service life. Owing to this facility, the working surface 12 of the seat 10 is arranged outside the zone of action of the mainstream abrasive flow directed along arrow "J", and this abrasive action is taken-up by the end face 44 of the crescent-shaped recess 40 of the working surface 12 of the seat 10 that does not participate in the sealing of the passage 2.

Thus the working surfaces 12, 39 of the seat 10 and gate 7, respectively, are protected against the wear by the abrasive flow, and their service life is prolonged.

The use of the invention improves the cost-effectiveness of the gate valve in the manufacture owing to the elimination of rather labor-consuming fitting operations, makes it possible to ensure a desired tightness of sealing in using the production equipment of lower accuracy.

In addition, the assembly of rapidly wearing parts of the gate and seat may be performed directly on the pipeline without their fitting to the casing (when these parts are replaced during operation) thus lowering the operation cost.

The service life of the gate valve is also prolonged.

The gate valves manufactured in accordance with the invention feature an improved cost-effectiveness in the manufacture, convenience in maintenance and repair and prolonged service life in operation in hydraulic conveyance of bulk abrasive materials in the coal and mining industries and in other industries.

We claim:

1. A gate valve comprising:

a casing;

a passageway defined in said casing having a centerline;

a valve seat mounted in said casing substantially coaxially with the centerline of said passageway;

a gate mounted in said casing for reciprocating movement into and out of cooperating engagement with said valve seat to close and open said passageway, respectively;

drive means operatively connected to said gate to impart said reciprocating movement to said gate;

at least one tapered face in the surface of said gate on the side thereof opposite that facing said valve seat and tapering in the direction of said reciprocating movement toward the closing position;

at least one stop member mounted in said casing having a flat surface facing and engageable with said at least one tapered surface when said gate is in the closed position;

at least one sleeve member rotatably mounted in a wall of said casing for relative rotation with respect thereto, said sleeve member having an inner surface with a longitudinal centerline extending transversely through the centerline of said passageway and an outer surface having a centerline extending eccentrically with respect to the centerline of the inner surface;

a rod member rotatably mounted in said inner surface for rotation about an axis extending coaxially with said centerline of said inner surface and having an end face facing toward the centerline of said passageway, said stop being rigidly secured to at least a part of said end face;

said flat surface of said stop lying in a plane including the axis of rotation of said rod member;

means to allow limited rotation of said rod member about its axis of rotation;

means to selectively rotate said sleeve member to adjust the distance between said flat surface on said valve seat; and means to fix the position of said sleeve member against spontaneous rotation thereof.

2. A gate valve as claimed in claim 1 wherein said means to allow limited rotation of said rod member comprises:
- a pin rigidly secured to said rod member and extending radially oppositely therefrom transversely to the axis of rotation thereof;
- two radially extending openings through said sleeve member through which opposite portions of said pin freely extend, said opening extending angularly an amount equal to the desired maximum angle of rotation of said sleeve; and
- grooves in said casing open toward said sleeve member positioned to freely receive the ends of said pin and having side walls limiting the displacement of said ends when said tapered face of said gate engages said at least one stop member.

3. A gate valve according to claim 1, wherein the eccentricity of the outer surface of the sleeve is such that the ratio of said eccentricity to the diameter of the outer surface of said sleeve does not exceed one-half of the coefficient of friction between said sleeve member and said casing.

4. A gate valve according to claim 1, wherein said sleeve member has an end face side opposite to the side facing toward said gate with a portion protruding outside said casing which is adapted to facilitate the application of a force causing rotation of said sleeve.

5. A gate valve according to claim 1, wherein annular members made of a wear-resistant material are rigidly secured to the surfaces of said valve seat and gate engaging each other when the gate is in the closed position.

6. A gate valve according to claim 5, wherein the axis of the annular member secured to said valve seat is offset with respect to the centerline of said valve seat in the direction of movement of said gate when it is moved in the closing direction.

* * * * *